(No Model.)
W. T. RICHARDSON.
NUT LOCK.
No. 521,941. Patented June 26, 1894.
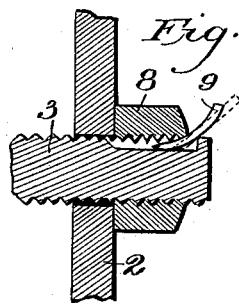
Fig. 7.
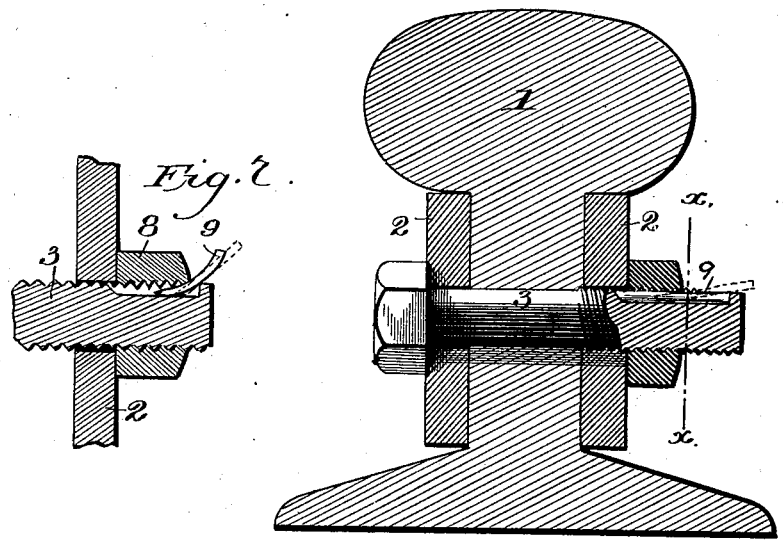
Fig. 1.
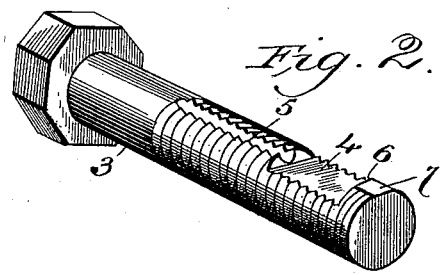
Fig. 2.
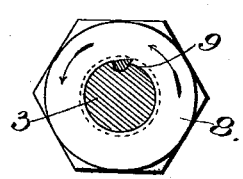
Fig. 3.
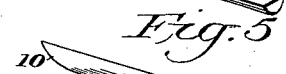
Fig. 4.
Fig. 5.
Fig. 6.
Witnesses
J. W. Reynolds
Chas. E. Hoyer
Inventor
Willis T. Richardson
By John Wedderburn
Attorney
THE NATIONAL LITHOGRAPHING COMPANY,
WASHINGTON, D. C.

UNITED STATES PATENT OFFICE.

WILLIS T. RICHARDSON, OF DAVID CITY, NEBRASKA.

NUT-LOCK.

SPECIFICATION forming part of Letters Patent No. 521,941, dated June 26, 1894.

Application filed December 21, 1893. Serial No. 494,320. (No model.)

*To all whom it may concern:*

Be it known that I, WILLIS T. RICHARDSON, a citizen of the United States, residing in David City, in the county of Butler and State of Nebraska, have invented certain new and useful Improvements in Nut-Locks; and I do hereby declare the following to be a full, clear, and exact description of the invention, such as will enable others skilled in the art to which it appertains to make and use the same.

This invention relates to nut locks and has for its object to provide a simple and effective lock to prevent the nut from turning and becoming loose on the bolt and wherein a lever pin or rod is employed, and of itself automatically fastened in position when applied.

With this and other objects in view the invention consists of the construction and arrangement of the several parts which will be more fully hereinafter described and claimed.

In the drawings:—Figure 1 is a transverse vertical section of a rail and fish plates, showing the improved nut lock applied thereto. Fig. 2 is a detail perspective view of the bolt employed in connection with the improved nut lock. Fig. 3 is a section on the line *x x*, Fig. 1. Fig. 4 is a detail perspective view of one form of the pin or rod. Fig. 5 is a similar view of another form of the pin or rod. Fig. 6 is a similar view of the preferred form of the rod or pin. Fig. 7 is a view similar to Fig. 1 showing the nut nearer the end of the bolt.

Similar numerals of reference are employed to indicate corresponding parts in the several views.

Referring to the drawings, the numeral 1 designates a rail and 2 the fish plates which are provided with aligned openings, as will be readily understood. In the said openings are removably placed bolts 3, which in all respects resemble and are constructed similarly to the ordinary form of bolt, except at the end thereof to which the nut is applied, a portion of the threads are cut away to form a transverse slot 4, from which extends a longitudinally disposed groove 5, it being observed that the outer wall of the slot 4 forms a shoulder 6, and the screw threads on the upper part of the shoulder being removed to provide a plain surface 7. To this bolt is applied a nut 8, which is of any preferred form of construction and interiorly screw threaded to engage the screw threads of the shank of the said bolt 3.

In assembling the several parts of the nut lock the bolt is inserted in position through the fish plates and the web of the rail and the nut 8 applied from the projecting end and screwed home against the adjacent fish plate, which will leave a small portion of the slot 4 exposed. A pin or rod 9, of a higher degree of temper than the nut or bolt is then driven into the slot and passes into the groove 5, and being of a resilient nature it partakes of a curved form, and after reaching its seat the outer end is sprung into the slot 4, and bears against the shoulder 6. The said pin or rod being of harder metal than the nut, removes or cuts away that portion of the thread of the nut which it engages and thereby mutilates the same and also prevents the nut from turning. It will be seen by the construction shown in Figs. 1 and 7 that in the first instance the pin will be arranged at a less angle when inserted in the slot 4 and groove 5 after the nut has been applied, than in the construction shown by Fig. 7 where the exposure of the slot is less and consequently the pin is caused to assume an angle of about forty-five degrees. When the rod is inserted it is assisted in entering by forming the inner lower end thereof with an upward curved bevel 10, to thereby prevent the point of the same from entering the metal in the base of the slot 4 to obviate sticking or doubling up, and at the same time causing the said pin or rod to bear against the adjacent portion of the screw threads of the nut to mutilate the same at this point as previously set forth. The said pin or rod 9 may be of any form desired, and, as shown in Fig. 4, it is of hemispherical form, in Fig. 5, triangular form, and in Fig. 6, of pear shape in cross section and having a biting or sharp edge 11, and a rounded back 12. When this preferred form of the pin or rod is inserted in the slot 4 and groove 5, any tendency of the nut to disengage itself from the bolt will be prevented, as shown in Fig. 3, where the form of the pin or rod shown by Fig. 6 is in position, the sharp edge 11 thereof is entered in such manner as to cut into the interior threads of the nut at about an angle of forty-five degrees to a central vertical plane, and any tendency of the nut to turn upon the bolt will cause the said pin or rod to be drawn up or turn more toward the said central vertical plane, and as the distance between the lowermost wall of the groove 5, and the adjacent inward extent of the threads of the nut in a vertical plane is less than the distance from the said lowermost wall of the groove and the point at which the said sharpened edge 11 is engaging the threads, as shown in Fig. 3, a greater binding action will ensue, and the more the tendency of the nut to release itself may be, the greater securing action will result.

The features of this invention are, first, the absolute certainty of its action, for no amount of jarring can cause the nut to turn back or the pin to drop out; second, the pin is self locking and after it is once driven into place no loss of temper or resiliency by the action of moisture can affect its efficiency; third, the nut can be screwed to the farthest possible limit before the pin is inserted and it is then held inflexibly at any desired point; fourth, the groove in the bolt need be of only slight depth while the nut is not weakened by multiplicity of grooves about its inner face. By the use of the peculiarly shaped pin an additional safeguard is provided.

It will be obviously apparent that many changes in the form, proportion and minor details of construction might be made and substituted for those shown and described without in the least departing from the nature and spirit of the invention. It will also be understood that the improved construction of nut lock heretofore set forth is adapted to be used in connection with all kinds of vehicles, machinery, or for such purposes to which it may be applicable in addition to those mentioned and described.

Having thus described the invention, what is claimed as new is—

1. In a nut lock, the combination with a nut, of a grooved bolt having a shoulder forming an abrupt abutment at the outer end wall of said groove, and a locking pin cam shaped in cross section and provided with a biting edge adapted to rock beyond the groove and engage the inner face of the nut in the manner described.

2. In a nut lock, the combination with a nut, of a longitudinal grooved bolt, provided with a cross-groove forming an abrupt shoulder at the outer end wall of said longitudinal groove and a locking pin cam shaped in cross-section and provided with a biting edge adapted to rock beyond the groove and engage the inner face of the nut in the manner described.

3. In a nut lock, the combination of a nut, a grooved bolt, an abrupt shoulder forming the outer end wall of said groove, and a self-locking pin having a biting edge that projects above the walls of the groove in the bolt and cuts an opposite groove in the thread of the nut when said pin is driven into place, said pin being retained in place by the end wall of the groove.

In testimony whereof I have signed this specification in the presence of two subscribing witnesses.

WILLIS T. RICHARDSON.

Witnesses:
AUGUSTUS P. SCHELL,
CHAS. S. HYER.